United States Patent Office 3,448,659
Patented June 10, 1969

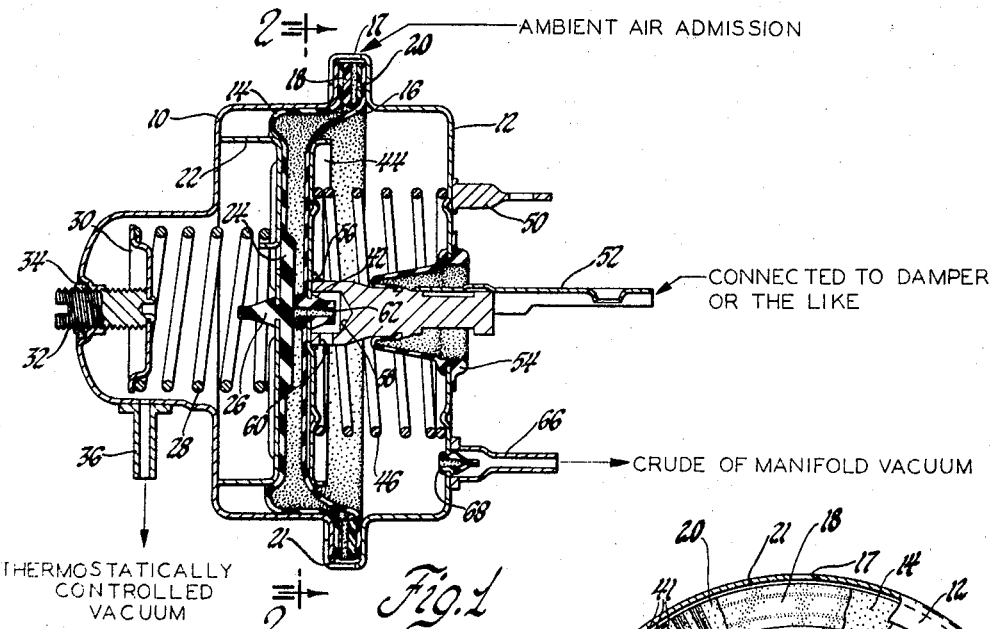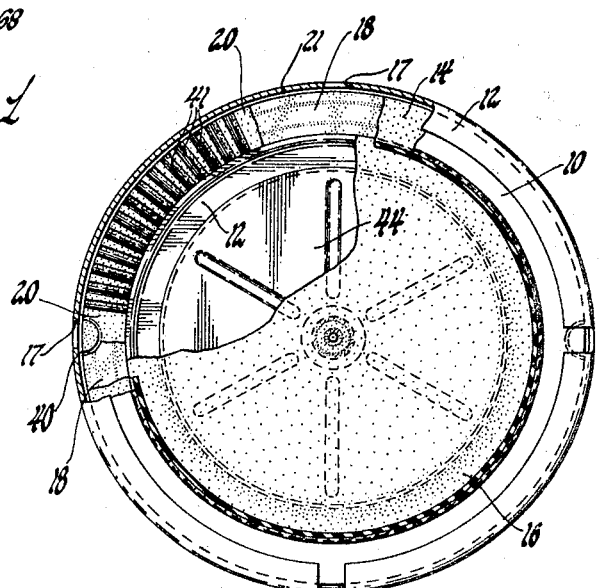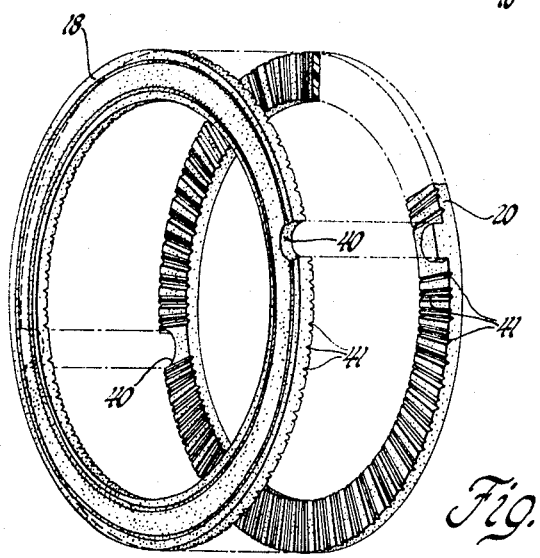

3,448,659
PILOTED VACUUM ACTUATOR
Paul K. Beatenbough, Medina, Ward H. Hutchins, Lockport, and John W. Orcutt, Cortland, N.Y., assignors to General Motors Corporation, Detroit, Mich., a corporation of Delaware
Filed Nov. 16, 1967, Ser. No. 683,646
Int. Cl. F15b 9/08, 15/08
U.S. Cl. 91—49   5 Claims

ABSTRACT OF THE DISCLOSURE

A motor for actuating a damper or the like in accordance with a degree of controlled vacuum applied to the motor, and provision being made for applying a degree of uncontrolled vacuum to the motor to overcome any frictional effects thereby to gain sensitivity of motor response.

---

This invention relates to a vacuum actuator and more particularly to an actuator or diaphragm motor for positioning a slave member such as a damper in accordance with a degree of vacuum imposed on the actuator.

In the United States Patent 3,319,888, granted May 16, 1967, in the name of J. E. Creager, a vacuum actuator employing a diaphragm and acting against a spring force is utilized to cause a damper to take a position proportional or in accordance with a degree of regulated or thermostatically controlled vacuum applied to the diaphragm. Satisfactory results are realized in the use of the patented arrangement but it has been found that hysteresis or frictional forces must be overcome before the damper moves and hysteresis detracts from promptness, sensitivity, or control accuracy of the motor reponse.

An object of the present invention is to provide an improved actuator in the operation of which the effect of hysteresis on motor operation is substantially eliminated.

A feature of the invention is an actuator having two diaphragms one of which is a driver diaphragm directly acted upon by a controlled vacuum, the other being a driven diaphragm indirectly acted upon by an uncontrolled vacuum, and ambient pressure directly acting upon both diaphragms, and a bleed valve being provided to vary the effect of the uncontrolled vacuum on the driven diaphragm.

This and other important features of the invention will now be described in detail in the specification and then pointed out more particularly in the appended claims.

In the drawings:

FIGURE 1 is a sectional view through an actuator shown as one embodiment of the present invention;

FIGURE 2 is a sectional view looking in the direction of the arrows 2—2 in FIGURE 1; and FIGURE 3 is an exploded perspective view of two sealing and controlled air admission rings present in the actuator assembly of FIGURES 1 and 2.

FIGURE 1 shows a casing made up of two sheet metal parts 10 and 12 crimped together at their peripheries tightly to hold the margins of two flexible diaphragms 14 and 16 as well as two nylon sealing rings 18 and 20 interposed between the two diaphragms. The crimping is such as to leave an annular chamber 21 between the rings and the largest inside diameter surface of the casing.

The casing part 10 encloses the diaphragm 14 herein termed the "driver" diaphragm. This diaphragm is of the rolling type having an intermediate portion supported by the bottom of a cup 22 to move therewith. The central portion of the diaphragm 14 bears a thickened section 24 adapted to serve as a valve seat and an oppositely disposed tab 26 adapted to protrude through the bottom of the cup 22 and aid in holding the diaphragm to the cup.

Centered on the bottom of the cup 22 is one end of a spring 28. The other end of this spring is retained by a disk 30 held by a screw 32. Once the actuator is properly calibrated to give a requisite loading on the spring 28, the screw 32 is welded as at 34 to the casing part 10. An inlet tube 36 is fixed to the casing part 10 and through which thermostatically controlled vacuum may be introduced to the casing. The purpose of the actuator is to operate a slave member such as a damper a linear or arcuate distance corresponding as closely as possible with a change in the degree of vacuum introduced through the inlet 36.

The two disks or rings 18 and 20 are preferably made of plastic such as nylon and they are suitably notched as at 40 to interfit in such a way that radial grooves 41 made in facing surfaces of the rings will not come into alignment. By causing the grooves to be out of alignment, the grooves 41 form very small radial passages excluding dirt but adequate for admitting air to what may be termed the "first" chamber defined in the casing between the two diaphragms 14 and 16. The chamber defined between the casing part 10 and the diaphragm 14 may be termed the "second chamber." Openings 17 in the casing and the annular chamber 21 permit air to reach all the grooves 42 but in a circuitous path guarding against the entry of foreign matter.

The casing part 12 cooperates with the diaphragm 16 in defining what may be termed the third chamber and the diaphragm 16 is herein described as a driven diaphragm. The central portion of the diaphragm 16 is held by means of a hub portion 42 which is integral with the diaphragm 16 and extends through an aperture in a metal cup 44. The hub portion 42 also extends toward the diaphragm 14 and is adapted to seat on the seat portion 24 of the diaphragm 14. A coil spring 46 is arranged to urge the diaphragm 16 and the cup 44 toward the left as viewed in FIGURE 1. Insofar as the present invention is concerned, the spring 46 may well be within the casing part 12 as disclosed in FIGURE 1. In some installations, however, this spring may be omitted and an externally applied spring may be effective for moving the diaphragm 16 by utilizing a bracket 50 welded to the casing part 12. An exterior spring may be provided to act between that bracket and a plunger 52 which extends outwardly from the casing and is adapted to be connected to a damper or other slave member which is to be positioned by the actuator.

The plunger 52 is adapted to move longitudinally with relation to the casing because of a resilient boot seal 54 connecting the plunger to the casing part 12. An interior wide end of the plunger 52 is welded as at 56 to the cup 44 and bears a recess 58 into which the hub 42 extends. The plunger 52 bears a radial aperture 60 and the recess 58 is of a size adequate to connect the aperture 60 with a central vent passage 62 in the hub 42.

An inlet tube 66 is connected to the casing part 12 and a rubber squeegee type restrictor 68 is placed in an orifice of the casing part 12 at the entrance of the tube 60. The tube 66 is adapted to be connected to a source of crude or uncontrolled vacuum such as the intake manifold of an internal combustion engine.

In operation of the actuator, the regulated or thermostatically controlled vacuum for operating the actuator is applied to the second chamber by way of the tube 36. This vacuum operates on the driver diaphragm 14 and compresses the calibrated spring 28. The driver or pilot diaphragm 14 and its spring 28 are forced to move without deterrent by any significant friction. The diaphragm 14 is, therefore, sensitive to the regulated vacuum and will take up a position proportional to the regulated or controlled vacuum. It will do this in response to very small changes in the controlled vacuum.

Upon application of the controlled vacuum to the second chamber, as stated above, air will flow into the first chamber, that is, the chamber between the two diaphragms 14 and 16 and then through the vent 62 and the radial passage 60 into the third chamber of the casing part 12. This is sufficient to overcome the vacuum in the third chamber because of the restrictor 68 which prevents a too rapid build-up of the vacuum. This bleed flow into the third chamber reduces the absolute pressure in the third chamber and the spring 46 forces the driven diaphragm 16 toward the driver diaphragm 14. As the diaphragm 16 approaches the diaphragm 14, the bleed valve or hub portion 42 throttles the bleed flow and when the bleed or air inlet flow equals the flow through the restrictor 68, the diaphragm 16 becomes stationary. After the diaphragm 16 stabilizes its position, the control vacuum in the second chamber may decrease in which event the diaphragm 14 will move toward the diaphragm 16 to seal the bleed valve. Crude vacuum in the third chamber is then greater than the bleed flow and serves to increase sufficiently to pull the driven diaphragm 16 away from the driver diaphragm 14. These actions continue until the two diaphragms 14 and 16 stabilize in their positions. If the control vacuum in the second chamber increases, the diaphragm 14 will move away from the driven diaphragm 16 and the bleed valve will open. The bleed flow then overcomes the restricted crude vacuum flow and the return spring 46 forces the diaphragm 16 toward the diaphragm 14 to stabilize.

If there is a small change in the regulated vacuum of the second chamber, the diaphragm 14 is free to move with no essential friction or binding as above stated. The vacuum in the third chamber can then change as much as required to overcome any friction or binding in the output mechanism.

We claim:
1. A vacuum actuator comprising a casing, a driver diaphragm and a driven diaphragm each traversing the interior of said casing and cooperating in separating the interior of the casing into three chambers one of which is defined between said diaphragms, means for admitting ambient air to said one chamber, a spring in a second of said chambers acting against said driver diaphragm, a plunger fixed to said driven diaphragm and extending through the third of said chambers and linearly movable with said driven diaphragm, spring means urging said driven diaphragm and plunger toward said driver diaphragm, a vent leading through said driven diaphragm to said one chamber and controlled by said driver diaphragm, means for admitting a controlled vacuum to said second chamber, and means for admitting a crude vacuum to said third chamber.

2. A vacuum actuator as set forth in claim 1, said driver diaphragm being in rolling contact with the said casing, and means for calibrating the loading of said spring in said second chamber.

3. A vacuum acutator as set forth in claim 1, said means for admitting air to said one chamber comprising a peripheral portion of said casing defining an annular chamber, two sealing rings with facing and contacting faces having non-aligned radial grooves leading from said annular chamber to said first chamber, and at least one aperture in said casing leading to said annular chamber.

4. A vacuum actuator comprising a casing with an interior traversed by two diaphragms to define three chambers in said casing, spring means urging said diaphragms toward each other, means for admitting ambient air to one of said chambers which is defined by said diaphragms, separate means for admitting vacuum to each of the other two chambers, one of said diaphragms carrying a bleed passage controlled by the other diaphragm, and a plunger slidable in sealed relation with said casing and fixed to said one diaphragm to move therewith.

5. A vacuum actuator as set forth in claim 4, a flexible sealing boot attaching said plunger to said casing, and a restrictor in the means for admitting vacuum to the portion of said casing surrounding said plunger and sealing boot.

References Cited

UNITED STATES PATENTS

| | | | |
|---|---|---|---|
| 2,602,429 | 7/1952 | Worster | 91—52 |
| 2,884,905 | 5/1959 | Jensen | 91—49 |
| 3,377,022 | 4/1968 | Beatenbough et al. | 236—86 |

PAUL E. MASLOUSKY, *Primary Examiner.*

U.S. Cl. X.R.

91—52, 401; 92—50; 236—82, 86